United States Patent [19]

Richards

[11] 3,835,507
[45] Sept. 17, 1974

[54] ROPE HOLDING DEVICE
[76] Inventor: John O. Richards, 980 Mill Cir., Alliance, Ohio 44601
[22] Filed: May 3, 1973
[21] Appl. No.: 356,849

[52] U.S. Cl. .............................. 24/134 R, 24/249 R
[51] Int. Cl. ........................................... F16g 11/10
[58] Field of Search ........... 24/134 R, 120, 249 R, 24/249 FP, 170; 339/274; 292/DIG. 7

[56] References Cited
UNITED STATES PATENTS

| | | | |
|---|---|---|---|
| 347,943 | 8/1886 | Leonardson | 24/134 R |
| 452,804 | 5/1891 | Rushton | 24/134 R |
| 536,729 | 4/1895 | Linden | 292/DIG. 7 |
| 609,112 | 8/1898 | Moore | 24/120 |
| 784,501 | 3/1905 | Robinson | 24/249 FP |
| 1,451,359 | 4/1923 | Campbell | 292/DIG. 7 |
| 2,238,386 | 4/1941 | Frank | 24/134 R |
| 2,435,447 | 2/1948 | Kortum | 24/134 R |
| 2,869,209 | 1/1959 | Kautzky | 24/249 FP |
| 3,045,306 | 7/1962 | Taylor | 24/134 R |
| 3,165,801 | 1/1965 | Stansbury | 24/134 R |

FOREIGN PATENTS OR APPLICATIONS

| | | | |
|---|---|---|---|
| 1,656 | 1/1896 | Great Britain | 24/120 |
| 750,801 | 6/1956 | Great Britain | 24/249 FP |

Primary Examiner—Bernard A. Gelak
Attorney, Agent, or Firm—Frease & Bishop

[57] ABSTRACT

A rope holding device having a resilient cylindrical-shaped cam mounted on a generally L-shaped bracket. A pair of discs is mounted on the circular ends of the cam by a pin. The pin eccentrically mounts the cam on one leg of the bracket for pivotal movement of the cam into clamping engagement with the other leg of the bracket for gripping a portion of a rope therebetween. The rope forms a groove in the cylindrical engaging surface of the cam preventing sideways disengagement of the rope, and the compression of the resilient cam by the rope maintains constant pressure on the rope preventing premature disengagement of the rope from its clamped position. A rod may extend radially outwardly from the cylindrical cam surface for locking engagement with notches formed in the clamping leg of the bracket.

4 Claims, 9 Drawing Figures

PATENTED SEP 17 1974 3,835,507

ROPE HOLDING DEVICE

BACKGROUND OF THE INVENTION

1. Field of the Invention

The invention relates to a holding device and in particular to a rope holding device having an eccentrically mounted rope clamping cam or roller. More particularly, the invention relates to a rope holding device in which the cam is formed of a resilient material which eliminates the need for additional components to hold the cam in clamping engagement with the rope due to the force exerted by the resiliency of the cam when compressed.

2. Description of the Prior Art

Many types of devices for gripping and holding rope have been used. Many of these devices use an eccentrically pivotally mounted wheel or cam which clamps the rope against an adjacent stop member. U.S. Pat. Nos. 15,279, 71,702, 201,035, and 296,633 show examples of such rope and strap holding devices using an eccentrically mounted wheel or cam.

These devices, however, are susceptible to releasing prematurely the grip on a rope or strap held thereby, especially when used in locations where the clamping device or rope is subjected to movement. For example, such premature releasement may occur when the clamping device is used on a moving vehicle to hold a canvas cover thereon, or when used to hold a tent flap, clothesline, or the like.

Additional retaining elements, such as springs or clamps, are used on prior rope clamping devices to overcome this problem and to prevent movement of the clamping wheel with respect to the attached rope, such as shown in U.S. Pat. Nos. 15,279, 575,064 and 1,503,567. These springs, however, are subject to breakage, they increase the cost of the clamp, and they increase the difficulty and time required for securing a rope thereby.

Other rope holding devices, such as shown in U.S. Pat. Nos. 2,561,514, 296,633 and 333,304 reduce this problem by providing teeth or serrated surfaces on the engaging or abutting cam surfaces which become embedded in the rope or strap upon engagement therewith. These structures, however, may damage and weaken the rope, especially when used over a period of time, and when clamped repeatedly at the same position on the rope.

These additional retaining elements are not required in those situations where the rope or clamping device is not subjected to frequent movement, vibration or additional stresses other than the usual rope tension. There is a need, however, for a clamping device for use on a moving vehicle such as a truck having a top canvas cover which is held in position by a plurality of clamps or attachment brackets spaced along the truck frame.

Known clamping devices having retaining spring means are not suitable for attaching such canvas tie-down ropes due to the forces exerted on the clamps by road vibrations, wind, etc. Thus, other means have been used, such as a fixed stationary bracket around which the rope ends are tied. These brackets require considerable time delay to a truck driver to attach a plurality of such tie-down ropes, which delay is expensive. Likewise, the ropes are difficult to untie when it is desired to remove the canvas top from the trailer due to accumulation of road dirt, etc., thereon and the tightening of the securing knot from the wind forces on the canvas.

Furthermore, many of the prior rope holding devices discussed above require the cam member and the corresponding clamping abutment means to be formed with grooves which correspond to a particular size of rope to be clamped. These grooves greatly increase the cost of these devices and seriously limit their versatility in application and use.

Thus, the need has existed for an improved rope holding device which requires no additional components such as springs, latches, etc., for holding the clamping cam in engaged position, and which will not release its clamping engagement with a rope prematurely due to vibrations and wind forces acting on the rope holding device and rope held thereby.

Furthermore, a need has existed for a rope holding device which is extremely simple, durable, and inexpensive in construction, operation and use, thereby reducing the time heretofore required to attach a plurality of ropes to prior rope holding devices, and which will clamp ropes of various diameters without changing the construction and components of the rope holding device.

SUMMARY OF THE INVENTION

Objectives of the invention include providing a rope holding device which enables ropes of various diameters to be securely clamped in a fixed position, which device greatly reduces the possibility of premature release of a clamped rope without requiring additional components, such as springs, latches, etc. for retaining the clamping member in engaged position as heretofore required; providing a rope clamping device having a cam member eccentrically pivotally mounted on one leg of a generally L-shaped bracket, and in which the other bracket leg serves as the abutting stop member against which the rope is clamped; providing a rope holding device in which the clamping cam is resilient, whereby a groove corresponding to the general shape and diameter of the rope being clamped is formed in the clamping surface of the cam, thereby preventing sideways disengagement of the rope therefrom, and eliminating the preforming of a groove in the cam member during manufacture which limits the size of ropes which may be clamped thereby; providing a rope holding device in which the resilient clamping cam has a generally cylindrical shape, which, when drawn into clamping engagement with a rope is compressed so that the force exerted by the compression of the material maintains a constant clamping force on the rope; providing a rope holding device in which simple lock means may be embedded in the resilient cam member to engage a notch formed in the abutting bracket leg to provide additional means to prevent premature release of a clamped rope; providing a rope clamping device which is dual directional enabling a rope to be clamped equally effectively from either of two opposite directions 180° apart; providing a rope holding device which may be mounted in various positions on a supporting structure without affecting the rope clamping efficiency thereof; and providing a rope clamping device which is of a simple construction free of components which are readily susceptive to damage and in frequent need of replacement, which is durable in use and operation, which achieves the stated objectives in a simple, effective and inexpensive manner, and which solves problems and satisfies needs existing in the art.

These and other objectives and advantages may be obtained by the rope holding device, the general nature of which may be stated as including generally L-shaped bracket means having first and second legs; cylindrical-shaped cam means having a pair of spaced flat circular end surfaces and a cylindrical surface joining said flat end surfaces; the cam means being formed of resilient material; pin means extending through the circular end surfaces eccentrically pivotally mounting the resilient cam means on the bracket means first leg means, whereby the cylindrical cam surface clamps a rope against the bracket means second leg upon rotation of the cam means; rod means embedded in the cylindrical surface of the cam means and extending radially outwardly therefrom; notch means formed in the bracket means second leg and engageable by the rod means to lock the cam means in rope holding position; and flat reinforcing discs mounted on each of the cam means flat circular end surfaces by the pivot pin means.

BRIEF DESCRIPTION OF THE DRAWINGS

Preferred embodiments of the invention — illustrative of the best modes in which applicant has contemplated applying the principles — are set forth in the following description and shown in the drawings and are particularly and distinctly pointed out and set forth in the appended claims.

Similar numerals refer to similar parts throughout the drawings.

DESCRIPTION OF THE PREFERRED EMBODIMENTS

First Embodiment

Figure 1:
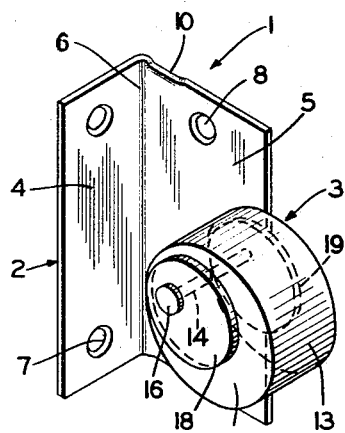
FIG. 1 is a perspective view of the improved rope holding device.

The improved rope holding device is indicated generally at 1 (FIG. 1) and includes an L-shaped bracket 2 having a cam 3 mounted thereon.

Figure 4:
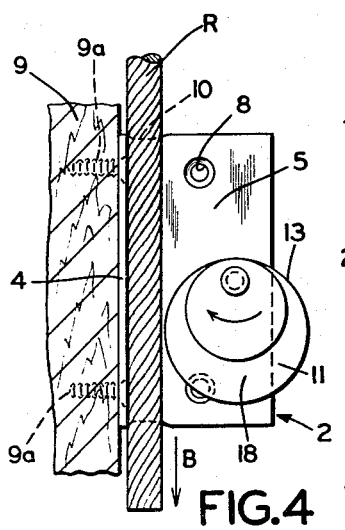
FIG. 4 is a fragmentary front elevation similar to FIG. 2, showing the rope holding device mounted on a structure, and shown in partially closed position adjacent a rope to be clamped thereby.
Figure 5:
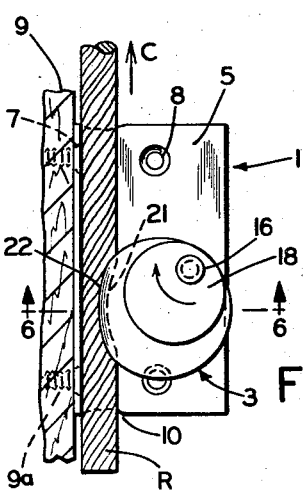
FIG. 5 is a view similar to FIG. 4 showing the rope holding device in rope clamping position.

Bracket 2 has a pair of legs 4 and 5 which are joined integrally in a generally right angle at corner 6. Holes 7 and 8 are formed in bracket legs 4 and 5, respectively, for attaching bracket 2 to a supporting structure 9 by screws 9a, such as shown in FIGS. 4 and 5. Smooth, rounded notched portions 10 are formed in the upper and lower edges of bracket leg 5 adjacent corner 6, the purpose of which is discussed below.

Cam 3 preferably is cylindrically shaped having a pair of spaced parallel end surfaces 11 and 12 joined together by cylindrical surface 13. In accordance with the invention, cam 3 is formed of a resilient material, such as polyurethane. However, other types of plastic, rubber, or synthetic materials having sufficient resiliency may be used depending upon the particular intended application of device 1, without affecting the results achieved thereby and without departing from the concept of the invention.

Figure 2:
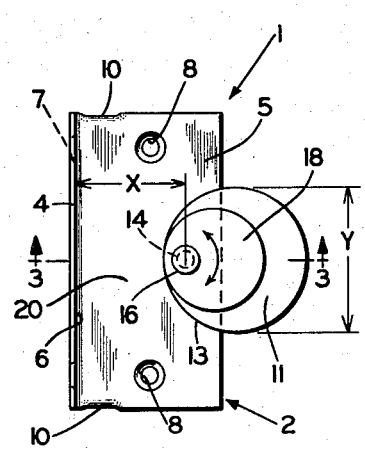
FIG. 2 is a front elevational view of the rope holding device in fully opened position.
Figure 3:
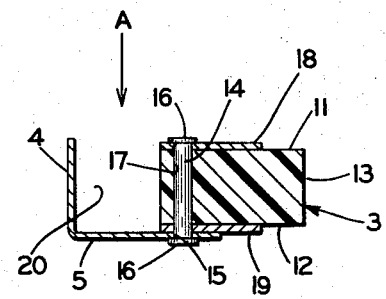
FIG. 3 is a sectional view taken on line 3—3, FIG. 2.

A pin 14 extends through cam 3 and projects beyond end surfaces 11 and 12. One end of pin 14 extends through an opening 15 formed in bracket leg 5 pivotally mounting cam 3 thereon. Pin 14 has enlarged heads 16 at both ends which secure cam 3 on bracket leg 5. Pin 14 extends through an eccentrically located opening 17 formed in cam 3, eccentrically mounting cam 3 on bracket leg 5, as shown in FIGS. 2 and 3.

Pin 14 preferably is located a distance "$x$" from bracket leg 4 (FIG. 2) which is less than the diameter "$y$" of cam 3 so that cam 3 will contact bracket leg 4 upon rotation of cam 3 in either direction.

A pair of flat, reinforcing discs 18 and 19 are mounted on cam end faces 11 and 12, respectively, by pin 14 to provide additional strength to cam 3 preventing excess deformation in an axial direction when clamping a rope. Discs 18 and 19 have a diameter smaller than diameter "$y$" of cam 3 and are eccentrically mounted with cam 3 as shown in FIG. 2. These discs preferably coincide with a portion of the circumference of cam 3 adjacent pivot pin 14 and are sufficiently spaced from the diametrical opposite circumferential portion of cam 3 to permit sufficient compression and deformation of the rope gripping portion of cam 3 without interference from discs 18 and 19, as shown in FIGS. 5 and 6.

Figure 6:
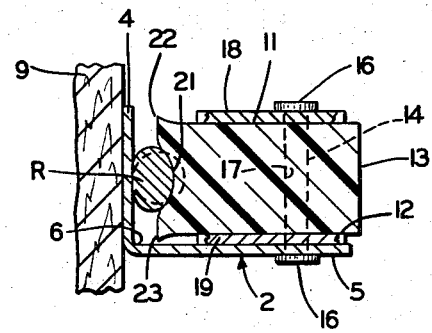
FIG. 6 is an enlarged fragmentary sectional view taken on line 6—6, FIG. 5.

The operation and manner of use of device 1 is shown in FIGS. 4, 5 and 6 wherein a portion of a rope R is clamped thereby. In fully open position (FIGS. 2 and 3), a space 20 is formed between cylindrical cam surface 13 and bracket leg 4 for receiving rope therein. Rope R may be inserted easily into space 20 in an axial direction with respect to pin 14, as indicated by arrow A, FIG. 3. Axial accessible space 20 eliminates the heretofore tedious and time consuming task of inserting the free end of the rope through a confined opening completely enclosed on all sides as in many prior clamping constructions.

A force, indicated by arrow B, FIG. 4, is applied to rope R and cam 3 is rotated in a clockwise direction until contacting rope R. A continuing rotational force is applied to cam 3 in the clockwise direction which together with the upwardly pulling force (arrow C, FIG. 5) exerted by the object being held by rope R, continues to rotate cam 3 in a clockwise direction until rope R is securely clamped between cylindrical surface 13 and bracket leg 4 due to the eccentric mounting of cam 3 on bracket leg 5. Cam 3 is prevented from rotating beyond its contact engagement with bracket leg 4 due to mounting distance "X" being smaller than diameter "Y" of cam 3.

The upward pulling force C of rope R tends to rotate cam 3 in a clockwise direction which is prevented by bracket leg 4. Rope R, thus compresses the abutting surface 13 of cam 3 forming a groove 21 therein and distorts the gripping portion of cam 3 as shown in FIGS. 5 and 6. The texture of cylindrical surface 13 has sufficient frictional characteristics, which, together with the usual rough and striated outer surface of rope R and the continual pressure exerted by the compression of cam 3 prevent rope R from slipping out of its clamped position between cam 3 and bracket leg 4.

The formation of groove 21 due to the resiliency of cam 3 and its abutment with rope R, forms ridge formations 22 and 23 on the sides of groove 21, as shown in FIG. 6. Ridges 22 and 23 prevent rope R from disengaging cam 3 by axial or sideways movement. Preferably the width of cylindrical surface 13 is greater than the diameter of a rope being clamped thereby to enable ridges 22 and 23 to be formed adjacent the rope.

Rope holding device 1 provides a very simple and highly efficient means of securing a rope in a tensioned condition. The resiliency of cam 3 maintains continual clamping pressure on the rope, thereby preventing premature disengagement with the rope due to the rope suddenly becoming slack, which occurs when the structure held by the rope is subjected to wind and vibrational forces. Thus, rope R may become slack with force C being reduced and even eliminated, without affecting the clamping force exerted by cam 3.

The formation of groove 21 and ridges 22 and 23 in cylindrical surface 13 of cam 3 at the point of engagement with rope R reduces the premature release of rope R in a sideways direction from its clamped position. Furthermore, ropes of various diameters can be quickly secured and clamped between cam 3 and bracket leg 4 with the resulting groove 21 and ridges 22 and 23 matching the diameter of the rope clamped thereby.

Reinforcing discs 18 and 19 (FIG. 6) prevent excess axial deformation of cam end surfaces 11 and 12, thereby assisting in the formation of ridges 22 and 23 without interfering with the clamping area of cam surface 13. Disc 19 also functions as a sliding plate against bracket leg 5 when cam 3 is rotated thereon.

Rope R is unclamped easily from device 1 by pulling downwardly on the rope end as indicated by arrow B, FIG. 4, which will rotate cam 3 automatically in a counterclockwise direction. Cam 3 then can be moved manually to its full open position of FIGS. 2 and 3, enabling rope R to be moved either sideways or vertically from its clamped position.

It is readily apparent, referring to FIGS. 4 and 5, that device 1 is equally effective when the object being retained by rope R exerts a pulling force in a downwardly direction, as indicated by arrow B, FIG. 4. Cam 3 merely is rotated in a counterclockwise direction to the clamped position such as shown in FIG. 7.

Figure 7:
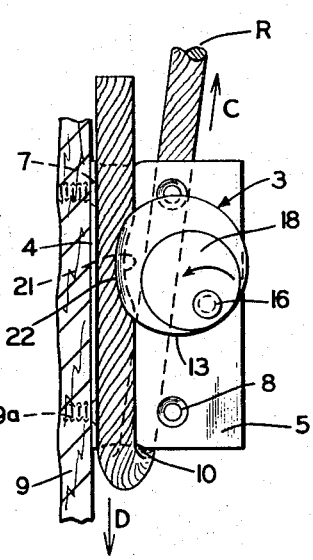
FIG. 7 is a view similar to FIG. 5 showing the rope holding device in reversed clamping position.

Additional clamping force also may be obtained by looping the free end of rope R about the bottom edge of bracket leg 5 in smooth notch 10, as indicated in FIG. 7, prior to locating rope R in space 20 between cam 3 and bracket leg 4. Force C is still in an upward direction as in FIG. 5, however a downward force D is exerted on that portion of rope R between cam 3 and bracket leg 4, and on cam 3. Thus, the pulling force C is held partially by the friction of looped rope R at notch 10, and partially by the clamping force exerted by cam 3. This connection is possible due to the dual clamping direction of cam 3.

Second Embodiment

Figure 8:
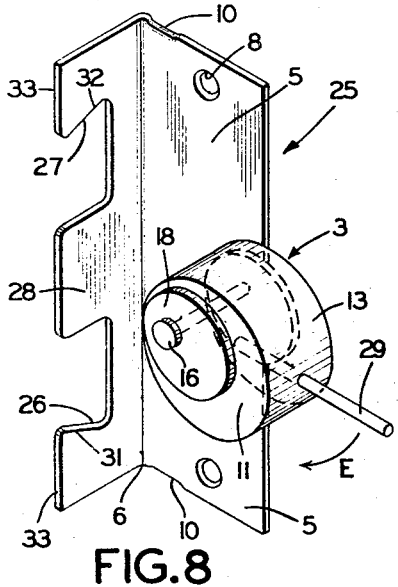
FIG. 8 is a perspective view similar to FIG. 1, showing a modified rope holding device.
Figure 9:
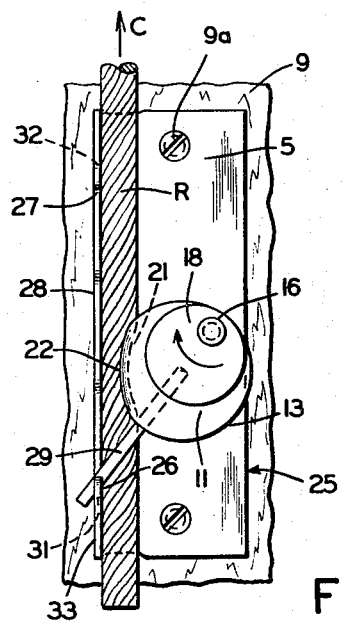
FIG. 9 is a view similar to FIG. 5 showing the modified rope holding device mounted on a structure and in clamping position.

A modified form of the invention is indicated at 25 and is shown in FIGS. 8 and 9, in which additional locking means is formed on cam 3. The construction of rope holding device 25 is similar in most respects to holding device 1 described above, except for the formation of notches 26 and 27 in bracket clamping leg 28, which corresponds to clamping leg 4 of bracket 2. A rod 29 is embedded in cam 3 and extends radially outwardly from cylindrical surface 13 for engaging notches 26 and 27 to lock cam 3 in clamping position.

The mode of operation and function of device 25 is similar to holding device 1 except rod 29 is engaged in notch 26 or 27, depending upon the directional force being applied to rope R, when cam 3 is in clamping position to provide additional means preventing rotation of disc 3 in the unclamping direction (counterclockwise, FIG. 9). Edges 31 and 32 of notches 26 and 27, respectively, are sloped in a direction away from cam 3, preventing sideways disengagement of rod 29 from notches 26 and 27.

Rod 29 merely moves outwardly in the direction of arrow E due to the resiliency of cam 3 and rides along bracket edge 33 when cam 3 is pivoted into engagement with rope R. Rod 29 automatically moves into notch 26 or 27 upon cam 3 clamping rope R due to the resiliency of cam 3 and the distortion caused by the sideways movement E of rod 29. Rod 29 preferably will be in a slightly stressed condition with respect to cam 3 when seated in notches 26 and 27, forcing rod 29 into the notches and against edges 31 and 32. The resiliency of cam 3 also permits a small amount of counterclockwise rotation of cam 3 when rod 29 is in the locked position of FIG. 9, without putting undue stress on rod 29 to cause breakage thereof. This permissible amount of counterclockwise rotation is not, however, sufficient to cause release of rope R from between cam 3 and bracket leg 4.

IN GENERAL

Accordingly, the improved rope holding device provides a construction for securely clamping a rope in a fixed position by cam means formed of resilient material whereby the force exerted by the resiliency of the material when compressed maintains constant clamping force on a rope reducing premature disengagement due to changes in tension of the clamped rope without requiring additional spring or latch components as heretofore required; provides a construction which can be mounted in various positions on a supporting structure without affecting the clamping ability thereof, and which is dual directional; provides a construction which may have additional latching means which are less susceptible to breakage than prior spring means and which utilizes the natural resiliency of the cam material to assist in maintaining the cam in clamped position; provides a construction which is adaptable for use with ropes of various diameters, and in which the rope being clamped forms a groove in the clamping portion of the cam thereby reducing the possibility of sideways disengagement of the rope from the cam without preforming such grooves in the cam surface during manufacture; and provides a construction which is extremely simple, durable and free of additional components which are susceptible to frequent repair and replacement, and which eliminates difficulties existing in the art, and which achieves the stated objectives.

Although rope holding devices 1 and 25 are described for use on vehicles to secure canvas cover tie-down ropes, such devices have many additional uses, such as on tent stakes, clothes lines, and the like.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details of the construction shown or described.

Having now described the features, discoveries and principles of the invention, the manner in which the improved rope holding device is constructed, assembled and operated, the characteristics of the new construction, and the advantageous, new and useful results obtained; the new and useful structures, devices, elements, arrangements, parts, and combinations are set forth in the appended claims.

I claim:

1. A rope holding device including generally L-shaped bracket means having first and second legs; a solid cylindrical-shaped cam formed of resilient material and having a pair of spaced flat, circular end surfaces and a smooth, cylindrical side camming surface extending between said end surfaces; pin means extending perpendicularly through the cam end surfaces and eccentrically pivotally mounting the cam on the bracket means first leg, said camming surface being adapted to clamp a rope against the second leg of the bracket means upon rotation of the cam; the cylindrical camming surface having a width greater than the diameter of a rope being clamped, with groove means and spaced ridge means being formed in the cylindrical camming surface due to the resiliency of the cam when said cam clamps a rope against the second leg of the bracket means to prevent sidewise disengagement of the rope from the cam; rod means embedded in the cam and extending radially outwardly from the cylindrical camming surface; the rod means being resiliently mounted on the cam and having limited movement in the axial and circumferential directions with respect to the cam due to the resiliency of the cam; and elongated notch means formed in the bracket means second leg with said rod means being engageable with the notch means to hold the cam in rope clamping position and to permit limited rotation of the cam in both clockwise and counterclockwise directions without the rod means being disengaged from the notch means.

2. The construction defined in claim 1 in which the distance of the cam pin means from the bracket means second leg is less than the diameter of the cylindrical cam whereby the camming surface engages the second leg upon rotation in the clockwise and counterclockwise directions.

3. The construction defined in claim 1 in which the cam is formed of polyurethane material.

4. The construction defined in claim 1 in which flat reinforcing discs are mounted on each of the cam means flat circular end surfaces by the pin means.

* * * * *